(12) United States Patent
Worsfold et al.

(10) Patent No.: US 10,129,848 B2
(45) Date of Patent: Nov. 13, 2018

(54) SYSTEM AND METHODS FOR LOCATING A MOBILE DEVICE

(71) Applicant: Yo Wireless Global LTD, Poole (GB)

(72) Inventors: Graham R Worsfold, Lakefield (CA); Geoffrey Girdler, Dorset (GB)

(73) Assignee: Yo Wireless Global Ltd.

( * ) Notice: Subject to any disclaimer, the term of this patent is extended or adjusted under 35 U.S.C. 154(b) by 0 days.

(21) Appl. No.: 15/520,145

(22) PCT Filed: May 5, 2016

(86) PCT No.: PCT/IB2016/052579
§ 371 (c)(1),
(2) Date: Apr. 19, 2017

(87) PCT Pub. No.: WO2016/178181
PCT Pub. Date: Nov. 10, 2016

(65) Prior Publication Data
US 2018/0014271 A1 Jan. 11, 2018

Related U.S. Application Data

(60) Provisional application No. 62/157,692, filed on May 6, 2015.

(51) Int. Cl.
*H04W 64/00* (2009.01)
*G01S 5/02* (2010.01)
*H04W 84/12* (2009.01)

(52) U.S. Cl.
CPC ......... *H04W 64/006* (2013.01); *G01S 5/0252* (2013.01); *H04W 84/12* (2013.01)

(58) Field of Classification Search
CPC .... H04W 64/006; H04W 84/12; G01S 5/0252
See application file for complete search history.

(56) References Cited

U.S. PATENT DOCUMENTS

2005/0197136 A1 9/2005 Friday et al.
2009/0046633 A1* 2/2009 Thomson ............... H04W 64/00
370/328

(Continued)

FOREIGN PATENT DOCUMENTS

WO WO2012091591 A1 7/2012

*Primary Examiner* — Keith Fang
(74) *Attorney, Agent, or Firm* — The Law Office of H. Dale Langley, Jr. P.C.

(57) ABSTRACT

A system for locating a mobile device emitting a radio frequency signal. A wireless access point device of a wireless local area network is configured to communicatively connect to a wide area network. The system comprises a first access device for wirelessly communicatively detecting a first signal strength of the radio frequency signal in relation to the first access device, a media access control (MAC) address, and a first timestamp of the first signal strength, of the mobile device; a second access device for wirelessly communicatively detecting a second signal strength of the radio frequency signal in relation to the second access device, the MAC address, and a second timestamp of the second signal strength, of the mobile device; a third access device for wirelessly communicatively detecting a third signal strength of the radio frequency signal in relation to the third access device, the MAC address, and a third timestamp of the third signal strength, of the mobile device.

5 Claims, 11 Drawing Sheets

(56) References Cited

U.S. PATENT DOCUMENTS

2010/0246419 A1      9/2010   Batta et al.
2014/0308976 A1*   10/2014   Garin .................... H04W 4/023
                                                                                      455/456.2

* cited by examiner

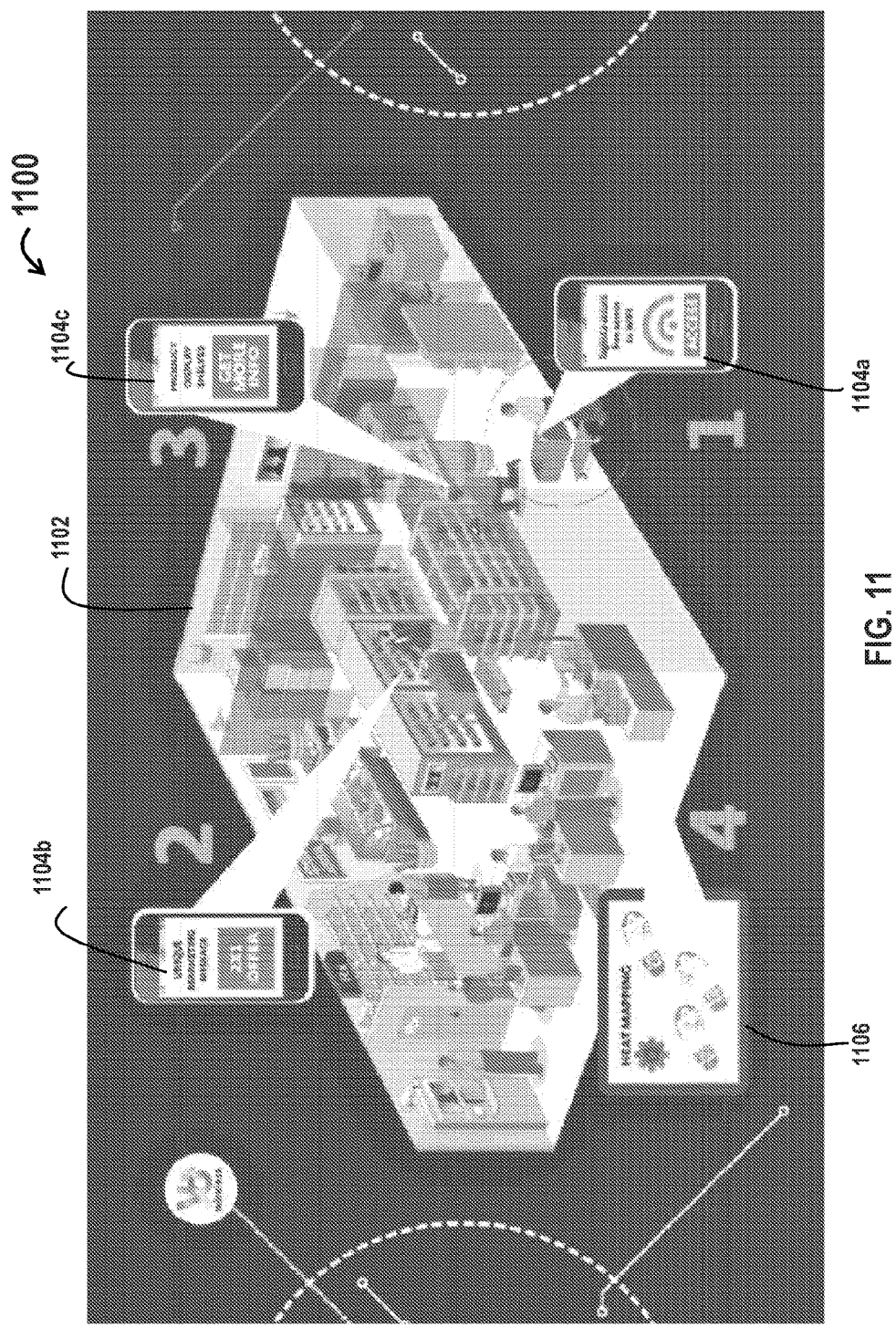

SYSTEM AND METHODS FOR LOCATING A MOBILE DEVICE

TECHNICAL FIELD

The invention generally relates to wireless communications networks and devices, and more particularly relates to location based tracking of devices through wireless access points and management cloud server, with minimal modification or disruption of host networks and devices.

BACKGROUND

Conventionally, location-based services (LBS) and real time location-based systems (RTLS) have been employed to identify and track devices or people or to obtain and use location data to control features for devices or the like. Implementing LBS and RTLS into existing telecommunications networks and infrastructure computing systems, however, has typically required extensive adaption and change to the networks and systems, as well as extensive management overhead. Costs and network disruption and integration that are required for implementing LBS and RTLS services of concentrated devices have been particularly impracticable.

In the conventional systems for LBS and RTLS services, the physical layer of LBS/RTLS technology employed to locate devices and provide services to the located devices is generally some form of wireless communications, such as Bluetooth™ low energy (BLE) proximity sensing, global positioning system (GPS) location, radio frequency identification (RFID), or similar. In order to be operable with conventional LBS/RTLS services, devices that are tracked have required particular capabilities and operations, for example, devices have had particular operations (e.g., Bluetooth, GPS, etc.), been of particular type or brand of device (e.g., iBeacon and Apple devices, etc.), and/or operated via dedicated software or embedded technology, such as a particular App processed on the devices, or the like.

One challenge presented by the conventional technologies when extending concentration is that infrastructure costs and network management overhead are substantially increased. Moreover, network and infrastructure complexity is necessarily increased, because the network and infrastructure must control and operate with the locational systems and the particularities of the LBS/RTLS environment of the relevant implementation. Further, performance and operations of the existing network and infrastructure systems can be hampered because of the additional loads resulting from the conventional LBS and RTLS implementation.

It would be an improvement and significant advance to provide LBS and RTLS systems and methods that limit impact to existing infrastructure and network systems. It would also be an improvement to provide improved data acquisition rates, positional precision and granularity to wireless networks in LBS and RTLS systems. It would further be an improvement to limit extent of operational and privacy intrusion in detection and tracking devices in those systems. Even more, it would be advantageous to provide systems and methods of LBS/RTLS having ability to identify and track a wide variety of different types or brands devices, for example, that may not be of any particular type or brand, have particular or specialized operational capabilities or elements, or include or have particular software, app or embedded technology or other distinct aspects or features.

SUMMARY

An embodiment of the invention is a system for locating a mobile device emitting a radio frequency signal. A wireless access point device of a wireless local area network is configured to communicatively connect to a wide area network. The system includes a first access device for wirelessly communicatively detecting a first signal strength of the radio frequency signal in relation to the first access device, a media access control (MAC) address, and a first timestamp of the first signal strength, of the mobile device, a second access device for wirelessly communicatively detecting a second signal strength of the radio frequency signal in relation to the second access device, the MAC address, and a second timestamp of the second signal strength, of the mobile device, a third access device for wirelessly communicatively detecting a third signal strength of the radio frequency signal in relation to the third access device, the MAC address, and a third timestamp of the third signal strength, of the mobile device, a trilateration processor, and a gateway device communicatively connected to the wireless local area network and the trilateration module, for communicative delivery of the first signal strength, the MAC address, and the first timestamp, the second signal strength, the MAC address, and the second timestamp, and the third signal strength, the MAC address, and the third timestamp, to the trilateration module. The first timestamp, the second timestamp and the third timestamp are substantially concurrent, and the first access device, the second access device and the third access device, wirelessly communicatively connect to the wireless access point device for delivery, respectively, of the first signal strength, the MAC address, and the first timestamp, the second signal strength, the MAC address, and the second timestamp, and the third signal strength, the MAC address, and the third timestamp.

Another embodiment of the invention is a method including probe signal sensing of a radio frequency communication of a mobile device, for a signal strength of the radio frequency communication, a MAC address of the mobile device, and a time of the radio frequency communication, collating the signal strength, the time and the MAC address, encrypting the signal strength, the time and the MAC address, and transmitting the signal strength, the time and the MAC address to a wireless access point device of a wireless local area network.

Yet another embodiment of the invention is a method including wirelessly communicatively detecting, respectively, by at least three access devices each, respectively, a signal strength, respectively, a timestamp, respectively, and a MAC address of a mobile device, wirelessly communicating, respectively, by each of the at least three access devices, the signal strength, respectively, the timestamp, respectively, and the MAC address, to a wireless local area network, receiving, respectively, by a gateway device communicatively connected to the wireless local area network and a wide area network, the signal strength, respectively, the timestamp, respectively, and the MAC address, for each of the at least three access devices, respectively, and transmitting, respectively, by the gateway device over the wide area network to a server, the signal strength, respectively, the timestamp, respectively, and the MAC address, for each of the at least three access devices, respectively.

BRIEF DESCRIPTION OF THE DRAWINGS

The present invention is illustrated by way of example and not limitation in the accompanying figures, in which like references indicate similar elements, and in which:

FIG. 11 illustrates an example system employed in a store or other area or facility, for detecting and locating one or more mobile device traversing the store or other area or facility, according to certain embodiments.

DETAILED DESCRIPTION

The following description refers to certain specific embodiments; however, the specific embodiments are merely illustrative and variations and changes may be made in the embodiments without diverting from the broad scope encompassed by the disclosure.

The present embodiments complement and support the addition of LBS-based wireless access devices that are added to a host network to improve deliverable performance and provide other advantages. The embodiments read only register level data from associated mobile devices within range, and the access devices of the embodiments do not service network traffic (other than specific data packets associated with LBS tracking and proximity detection). The embodiments do not present any significant data management demands or network integration overhead to a host wireless local area network (WLAN). The access devices of the embodiments connect using an internal WiFi chipset and present to the host WLAN as a simple client device with specific media access control (MAC) address.

As a consequence, embodiments can be located at key points in a retail store, building, work group, area or other environment without physical connection to the retail store, building, work group, area or other infrastructure network. All mobile devices can then be detected within a specific range using on-board threshold settings of the access devices. Once detected, specific location register-level information can be sent by the access devices over the host WLAN in real time, to a record management system (RMS) cloud server to compute mobile device(s) proximity and/or location metrics and integrate into a live mapping portal.

Figure 1:
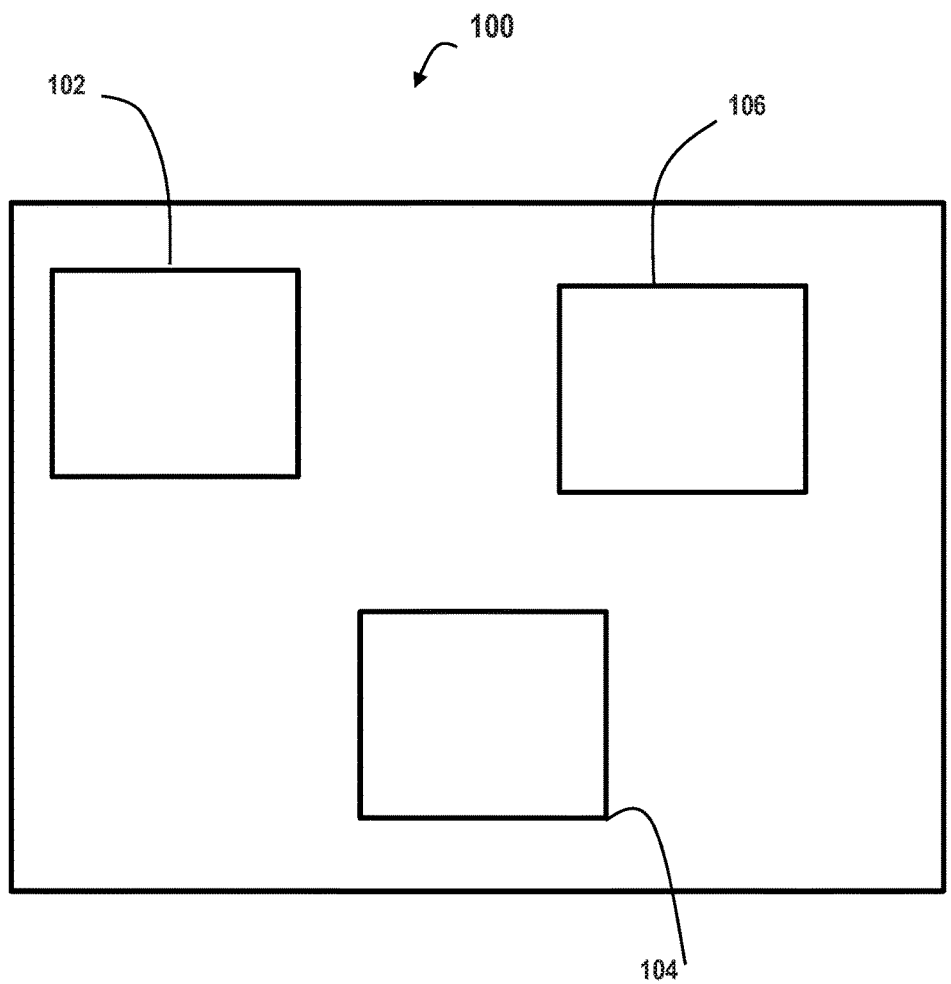
FIG. 1 illustrates an access device (e.g., a beacon) of modular architecture, for communicative connection to a wireless local area (WLAN) network (e.g., 802.11 standard or other) for delivery of vector data packets via a gateway device to a cloud server computer over a wide area network (WAN), such as, for example, the Internet, according to certain embodiments.

Access Device:

Referring to FIG. 1, according to certain embodiments, an access device 100 for use as a wireless access device to detect proximity and location of wireless communications devices (i.e., sometimes referred to herein as "mobile devices", although any wireless device(s) are contemplated as included in the embodiments) includes a three level modular architecture to facilitate probe signal sensing and transmission functions. A first module 102 is a sensing layer that reads key positioning data relating to signal strength and transmission time and an associated MAC address of any wireless (e.g., mobile or other) device(s) within range of the device 100. A second module 104 communicatively connected to the first module 102 collates and encrypts vector based register data of detected signal strength and transmission time of the wireless device associated with the MAC address, into a transmission packet. A third module 106 communicatively connected to the second module 104 wirelessly links to a host WLAN.

A non-exclusive example of the first module 102 is a wireless 802.11b/g/n AP subset (or other wireless standard or proprietary technology) comprised of a sensor chipset. The sensor chipset is capable of reading signal strength, transmission time, and MAC address of any mobile device(s) operating for wireless communications according to the wireless subset within a threshold range distance. A non-exclusive example of the second module 104 is a System on Chip (SoC) central processing unit (CPU) (or other processor). The processor is configured, either via logical elements of the processor, software stored in tangible medium and processed by the processor, combinations of these, or otherwise, to collate and encrypt the vector based register data of detected signal strength and transmission time of respective mobile device(s) associated with the respective MAC address(es). A non-exclusive example of the third module 106 is a radio, such as an 802.11 (or other wireless standard or proprietary technology) embedded WiFi chipset or other element or elements, configured to wirelessly link with a WLAN, such as a host WLAN system (e.g., which may be an existing enterprise system or otherwise implemented in an enterprise, such as a retail store, building, work group, area or other environment) via a wireless access point (AP)

of the host WLAN system (as non-exclusive example, an 802.11, other standard, or proprietary AP protocol), via a known service set identifier (SSID) of the host WLAN.

Although the modules 102, 104, 106 are described as discrete elements, the discrete nature so described is merely for purposes of operational understanding; therefore, the modules 102, 104, 106 may be implemented as individual or unitized elements, in any combination, in the embodiments, including one or more processor, memory, software programs stored in memory, radio, and the like.

In operation, the device 100 reads probe data from any detected mobile devices. The probe data includes vector based register data of signal strength and transmission time of respective mobile devices and associated respective MAC addresses of the mobile devices. The probe data is collated and encrypted by the device 100 for wireless transmission according to a host WLAN's requirements (e.g., 802.11 standard or other) for receiving the collated and encrypted probe data. The collated and encrypted probe data is wirelessly communicated by the radio of the device 100, to the host WLAN.

Figure 2:
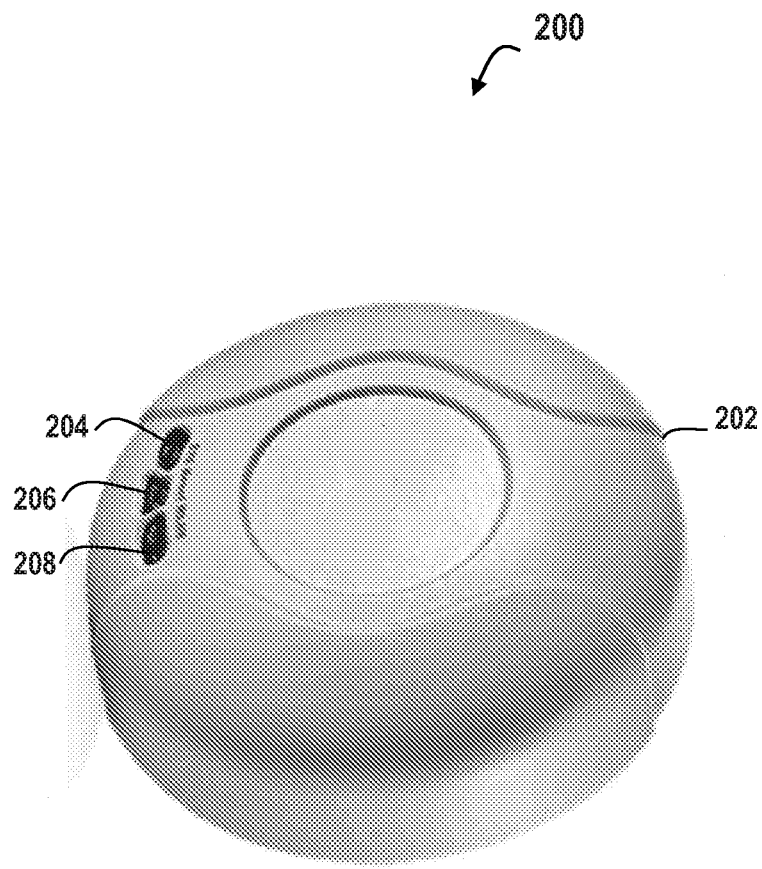
FIG. 2 illustrates a housing of an access device of modular architecture, for communicative connection to a WLAN network for delivery of vector data packets via a gateway device to a cloud server computer over a WAN, according to certain embodiments.

Referring to FIG. 2, in conjunction with FIG. 1, a device 200 forms a housing 202 for the device 100. A non-exclusive embodiment of the housing 202 is a generally oval-shaped partial spherical or clamshell structure. The housing 202 encloses the modules 102, 104, 106 of the device 100. The housing 202 may include accessible features to the modules 102, 104, 106 of the device 100, for non-exclusive example, a system on/off button 204, a system reset button 206, and a WLAN connectivity alert light 208, or otherwise.

Figure 3:
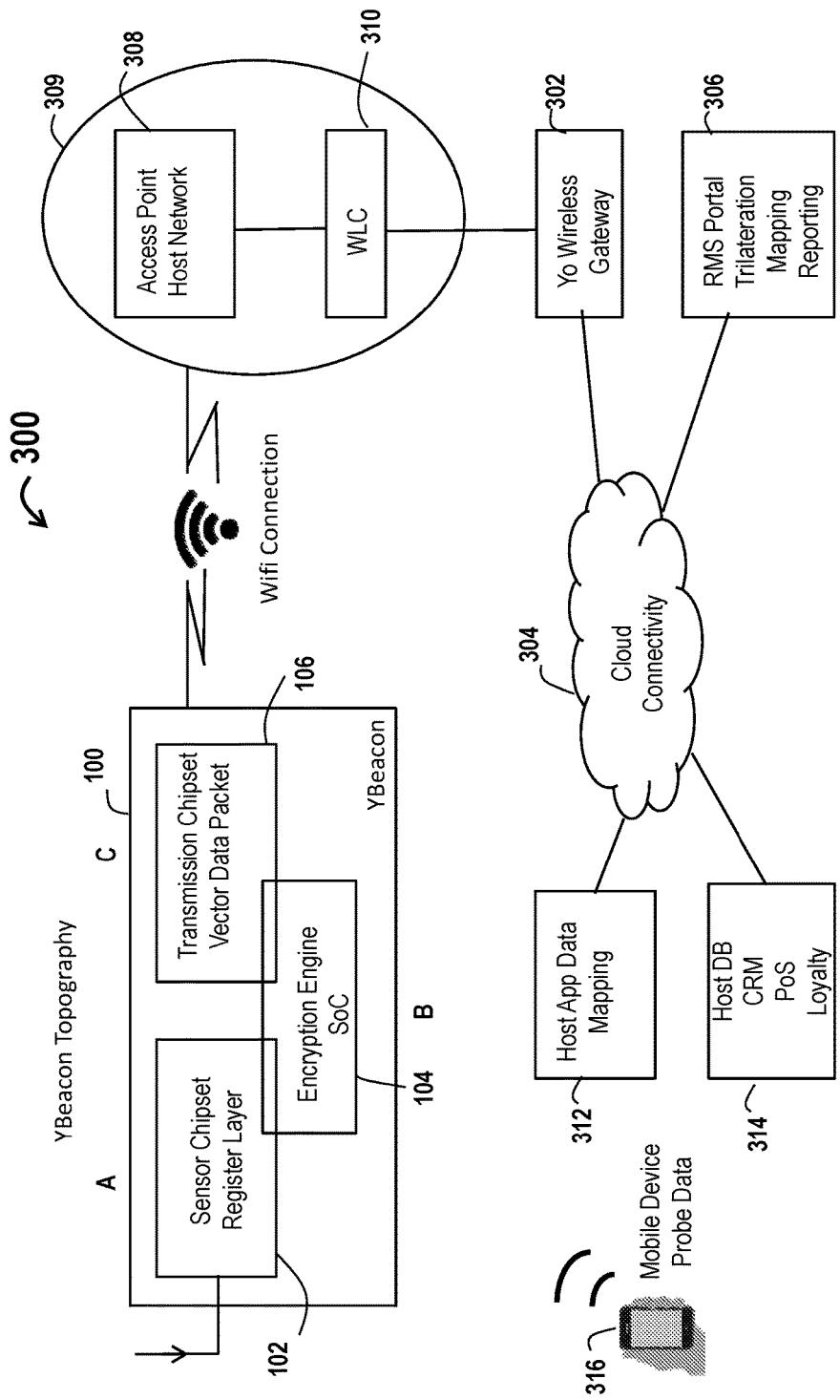
FIG. 3 illustrates a system of at least one access device communicatively connected to a WLAN network for delivery of vector data packets via a wireless gateway to a cloud or other server computer over a WAN, according to certain embodiments.

Referring to FIG. 3, in conjunction with FIGS. 1 and 2, a system 300 includes at least one of the device 100, such as that of the device 200. The system 300 also includes a wireless gateway 302 for the at least one of the device 100, communicatively connected, such as over a wide area network 304, for example, the Internet, cloud network, or otherwise, to a records management system 306. The wireless gateway 302 is communicatively connected to an access point (AP) 308 of a host wireless network 309 and a host wireless local area network (LAN) controller 310. In certain non-exclusive embodiments, the AP 308 of the host wireless network 309 and the host wireless LAN controller 310 include existing infrastructure network and computing systems of an enterprise, such as these of a retail store, a building, a work group, area, or other.

As will be understood, the host networks and systems may include additional elements or units 312, 314, for non-exclusive example, host application programs stored in tangible media (e.g., data, mapping, etc.), host database programs stored in tangible media (e.g., customer relationship manager, point of sale, loyalty programs, etc.), and/or other programs stored in tangible media and/or computing or processing systems, as applicable for the particular implementation.

In operation, the device 100 reads probe data of signal strength and transmission time, together with MAC address, of any mobile device(s) 316 within a threshold geographic (or other) range of the device 100. Upon detecting the mobile device 316, such as via the first module 102 of the device 100, the device 100, such as via the second module 104, collates and encrypts the probe data for transmission. The device 100, such as via the third module 106, transmits a vector data packet (i.e., corresponding to the probe data for the mobile device 316) to the AP 308 of the host wireless network 309.

The host wireless network 309 communicates the vector data packet received by the AP 308 of the host wireless network 309, as controlled by the host wireless LAN controller 310, directing the vector data packet to the wireless gateway 302 for each of the at least one device 100. The wireless gateway 302 communicates the vector data packet over the wide area network 304, for example, over the Internet or other data network, to the records management system 306.

In certain non-exclusive embodiments, the vector data packet is transmitted across the host wireless network 309, via the AP 308 and the wireless LAN controller 310, to a guest access platform (e.g., the wireless gateway 302) separate from the WLAN host network 309 (e.g., separate from any back end office or retail system of the core corporate network that includes the WLAN). The wireless gateway 302 white lists the MAC address(es) of respective mobile device(s) 316 detected by the at least one device 100, to allow direct connection to a uniform resource locator (URL) of the records management system 306, such as, for example, a cloud server or other device, communicatively connected to the wide area network 304, such as the Internet or other data or communications network.

Figure 4:
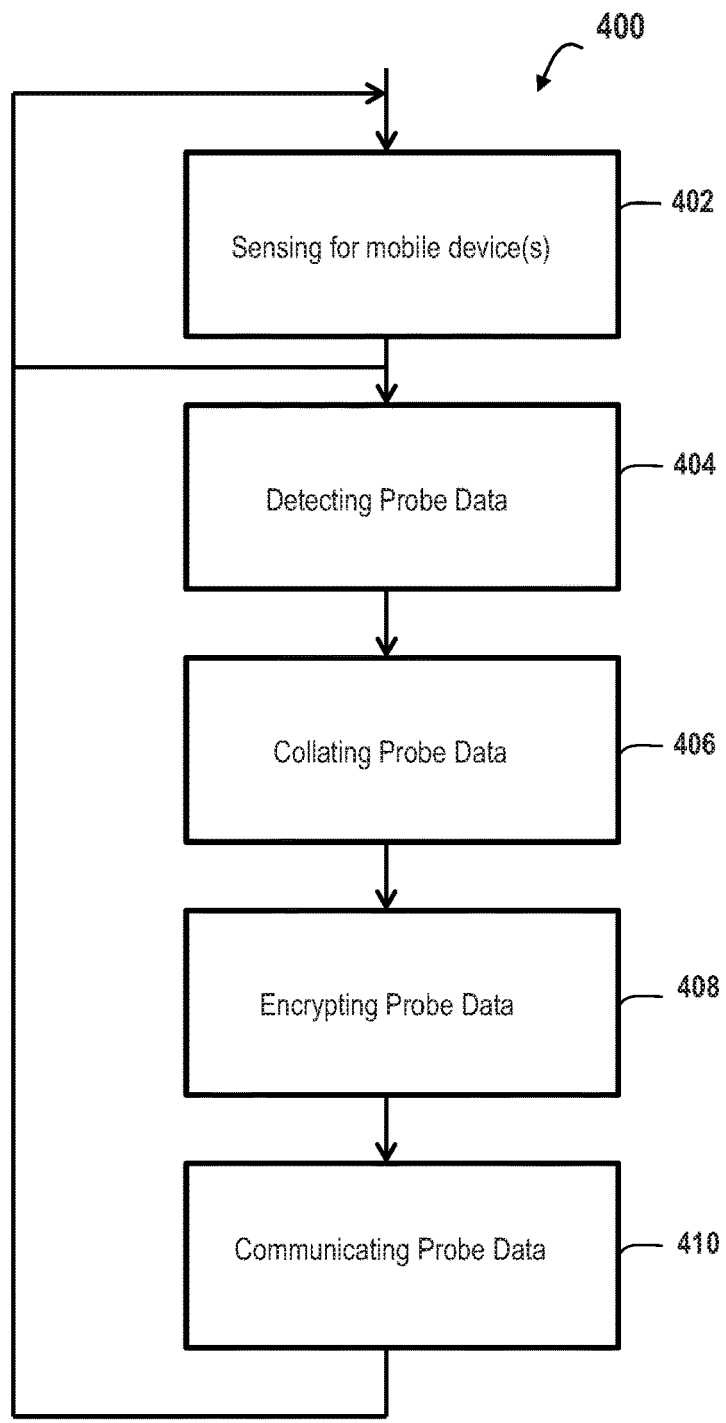
FIG. 4 illustrates a method of operation of an access device for communicative connection to a WLAN network for delivery of vector data packets via a wireless gateway to a cloud or other server computer over a WAN, according to certain embodiments.

Referring to FIG. 4, in conjunction with FIGS. 1-3, a method 400 performed by the access device 100 (for example, the device 200 strategically positioned in retail store, building, work group, area or other environment) includes sensing 402 for mobile device(s) within a threshold range of the device 100. The sensing 402 is substantially continuous, intermittent, or as otherwise desirable for the particular implementation. Upon sensing 402 any mobile device(s) within range, the device 100 detects probe data of the mobile device(s) in a step 404.

Upon detecting 404 the probe data, which, for non-exclusive example, includes signal strength(s) and transmission time(s), together with MAC address(es) of the relevant mobile device(s), the device 100 collates the probe data in a step 406. The probe data from collating 406 is encrypted by the device 100 in a step 408. The collated and encrypted probe data from the steps 404, 406, is communicated by the device 100, for example, wirelessly, to an AP 308 of the host network 309, for delivery to the gateway 302 and over the network 304 to the records management system 306.

Records Management System

Figure 5:
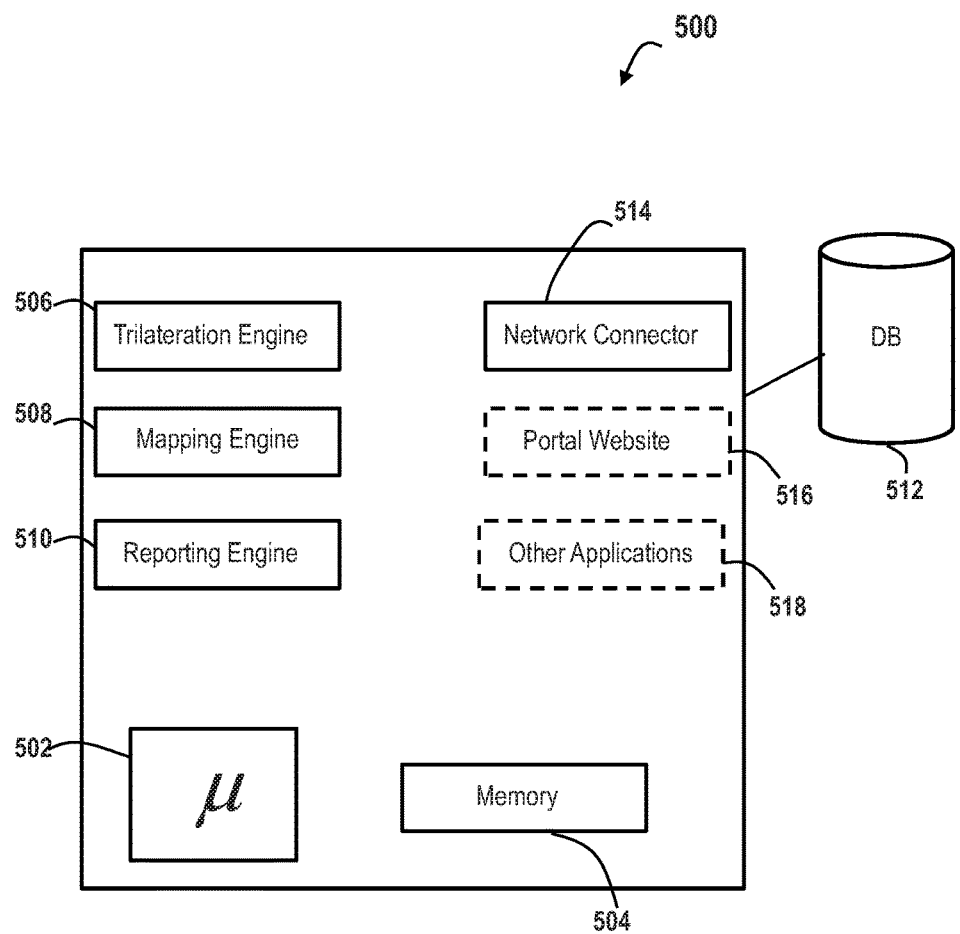
FIG. 5 illustrates a system for records management of vector data packets detected by one or more access device and corresponding to one or more mobile device within range of the one or more access device, communicatively receivable via a wireless gateway over a WAN, according to certain embodiments.

Referring to FIG. 5, in conjunction with FIGS. 1-4, a system 500 for records management, for example, in the system 300 including at least one of the device 100, includes a processor 502 communicatively connected to memory 504. The system 500 also may include a trilateration engine 506, a mapping engine 508 and a reporting engine 510. The system 500 may include or communicatively connect to a storage 512 and a network connector 514. The system may also, but need not necessarily, include a portal website 516 and/or other application programs or units 518.

The processor 502, in operation with the memory 504, is specially configured, or includes or communicatively connects to software stored in tangible media for processing, or through combinations of these and/or other elements operates, as the trilateration engine 506, the mapping engine 508 and/or the reporting engine 510, as applicable in the desired implementation. The trilateration engine 506 processes vector data packets from one or more device 100 (i.e., corresponding to any detected mobile device 316), and received by the network connector 514 over the wide area network 304 from the gateway 302 and the WLAN host network 309 including the AP 308 communicatively connected to the one or more device 100. The mapping engine 508 generates a map of a geographic location of the device 100 (corresponding to any detected mobile device 316; and of other device(s)

100, if more than one, and corresponding detected mobile device(s) 316, if more than one) communicatively connected to the WLAN host network 309 via the AP 308, together with the retail store or other environment of the particular implementation of the system 300. The trilateration engine 506, from processed vector packets, in conjunction with the mapping engine 508, processingly pinpoints geographic location of each mobile device 316 (e.g., one or more) and plots location thereof on the map through conversion of the vector data packets to absolute x, y Cartesian coordinates (or as otherwise applicable in the implementation). The reporting engine 510 generates reports, including, for non-exclusive example, reports of detected mobile device(s), location(s), retail and locational metrics, and others.

Although a single processor and memory are illustrated in the system 500, any number of processors and/or memories may in combination serve as or for any of the trilateration engine 506, the mapping engine 508 and/or the reporting engine 510, including but not limited to disparate communicatively connected units or portions of these. The processor and memory, whether one or more in each case, are located remote or are otherwise distinct from the WLAN host network 309. Trilateration, mapping and reporting by these engines 506, 508, 510, respectively, is therefore by separate elements and modules apart from any back end office or retail system of the core corporate network and does not present any significant data management demands or network integration overhead to the WLAN host network 309 because required to only communicate vector packets corresponding to one or more devices 100 detecting mobile device(s) 316.

In operation, the system 500, as non-exclusive example, one or more of a server computer that may be communicatively accessible (e.g., a cloud server or other) to or by the wireless gateway 302, receives vector data packet(s) output via the wireless gateway 302. The vector data packet(s) correspond to mobile device(s) 316, MAC address(es) of those device(s) 316, and time stamp for the packet(s), located within threshold range of and detected by at least one of the device 100. The packet(s), respective MAC addresses and time stamps, are communicated over the WLAN host network 309 as directed by the host wireless LAN controller 310 to the wireless gateway 302 and on to the system 500 over the network 304. The network connector 514, controlled by the processor 502, receiving the vector data packet(s), respective MAC addresses and time stamps, communicates these to the trilateration engine 506 of the system 500.

Figure 6:
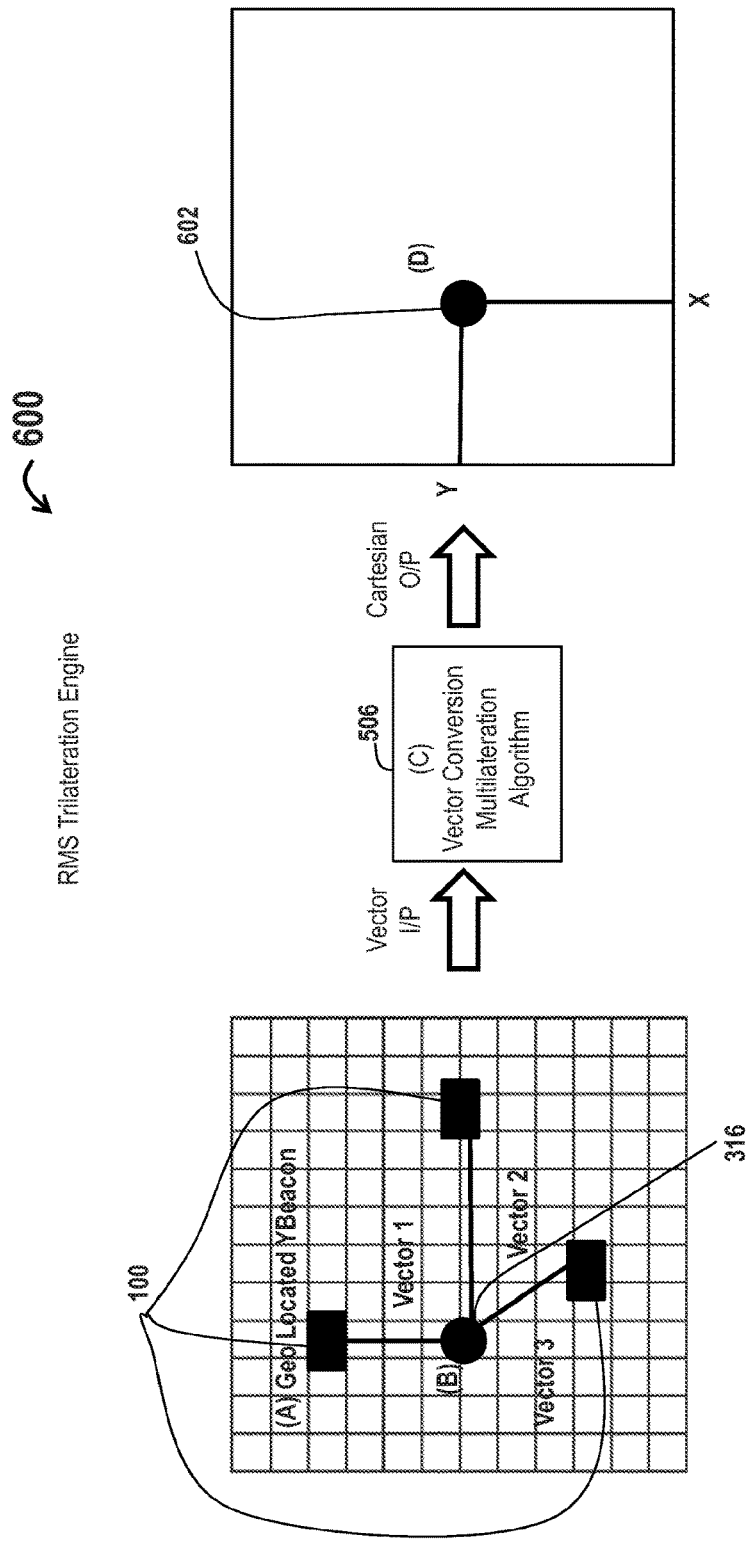
FIG. 6 illustrates a trilateration by a records management system (RMS) communicatively connected to a WAN by a wireless gateway for delivering vector data packets of a mobile device detected by three access devices communicatively connected to the wireless gateway, to locate the mobile device, according to certain embodiments.

Referring to FIG. 6, a non-exclusive example of operation of the trilateration engine 506, is illustrated in a system 600 of wireless access devices 100, in this case three of the devices 100, detecting a mobile device 316 located within a threshold range, respectively, of the access devices, respectively. The trilateration engine 506 of the system 500 converts the vector data packet(s) into coordinates for locational positioning of mobile device(s) 316 when substantially concurrently detected by any three or more of the access devices 100. In the conversion by the trilateration engine 506, the engine 506 associates each received vector data packet(s) with associated MAC address(es) and time stamp(s), respectively. The vector data packets, time stamps and MAC address applicable for the detected mobile device 316, in each instance (e.g., from detection by three or more of the devices 100), are then processingly converted by the trilateration engine 506 to locate a position of the corresponding mobile device 316. The trilateration engine 506 converts the vector data to Cartesian coordinates, creating an x, y position 602 relative to each of the access devices 100 then concurrently detecting that corresponding mobile device 316.

If trilateration by the trilateration engine 506 is not possible (e.g., fewer than three of the devices 100 detect the particular mobile device), or if, in the embodiment, only proximity detection to any device 100 is required or implemented in the case of the particular mobile device, the engine 506, rather than perform trilateration, instead reports that the mobile device is within a threshold proximity range (e.g., a predefined proximity radius) of the access device 100 upon its detection of the mobile device within the range. That threshold proximity range may be set, as non-exclusive example, to allow different detection levels depending upon application requirements in the implementation.

If three or more of the access devices 100 detect a target device probe data via its associated MAC address, the vector data packets and time stamps, respectively, and MAC address, are all processed by the trilateration engine to locate the absolute position of that target device. The vector data packets to Cartesian conversion creates the x, y position 602 relative to each of the access devices 100 then substantially concurrently detecting the target device.

On conversion by the trilateration engine 506, the mapping engine 508 maps the three or more of the devices 100 detecting the target device at the x, y position 602. The mapping engine 508 locates the devices 100 by geographic position on a map produced by the engine 508, for non-exclusive example, an embedded high resolution map of a store, building, work group, area or other of the particular implementation. The map of the mapping engine 508 provides a geographically located grid of the devices 100, and plots target device position on the map via the x, y position 602 of Cartesian coordinates generated by the trilateration engine 506.

The reporting engine 510, based on the geographically located grid of the devices 100, and positioning from time to time of detected targeted devices on the map by the mapping engine 508, collects position data and information of the targeted devices for analysis in the form of a wide variety of reports. In certain non-exclusive embodiments, for example, the reporting engine 510 collects in the database 512 position data and information of targeted devices. The database 512 may, additionally, be communicatively connected to the trilateration engine 506 for performing trilateration based on then current and historical position and information data of targeted devices, to the mapping engine for storage of map(s) and locational data for devices 100, and otherwise integral to or communicatively connected to these engines 506, 508, 510 for qualitative and quantitative analytics or otherwise. The reporting engine 510 may communicatively connect to the portal website 516 (if applicable in the embodiment), to provide communicative access to various communications devices (e.g., smart phone, desktop computer, tablet computer, or other) to reports and other information of positions, timing, and other metrics of detected targeted devices and devices 100 relevant thereto.

In certain alternatives, the trilateration engine 506 may also include or communicatively connect to additional, different or further locational logic elements, to allow, for non-exclusive example, employment of timing inputs measuring the Time of Arrival (ToA) of vector data packets, respectively, the Signal to Noise Ratio (SNR) of the device(s) 100 for output/detections, and other logical elements of the devices 100, detected target devices, and other features. The ToA measurements and SNR metrics may be employed by the system 500 to improve precision of detection and of vector data packet analysis, to overcome external Radio Frequency Interference (RFI) caused by environmental factors that may impact signal stability for devices 100 and targeted devices, and others. In certain other alternatives, the system 500 may establish communicative links to mobile application programming interfaces (APIs) of targeted devices, such as, for example, to access accelerometer and internal positioning registers, or otherwise. Such alternatives may enhance output data precision, mapping, and reporting by determining whether targeted devices, respectively, are actually moving, and if so, in which direction and at what rate. In even further alternatives, This data point is mapped onto the embedded grid mapping module and allows visual location data to be presented as a visual analytic mapping tool that overlays the store layout.

Figure 7:
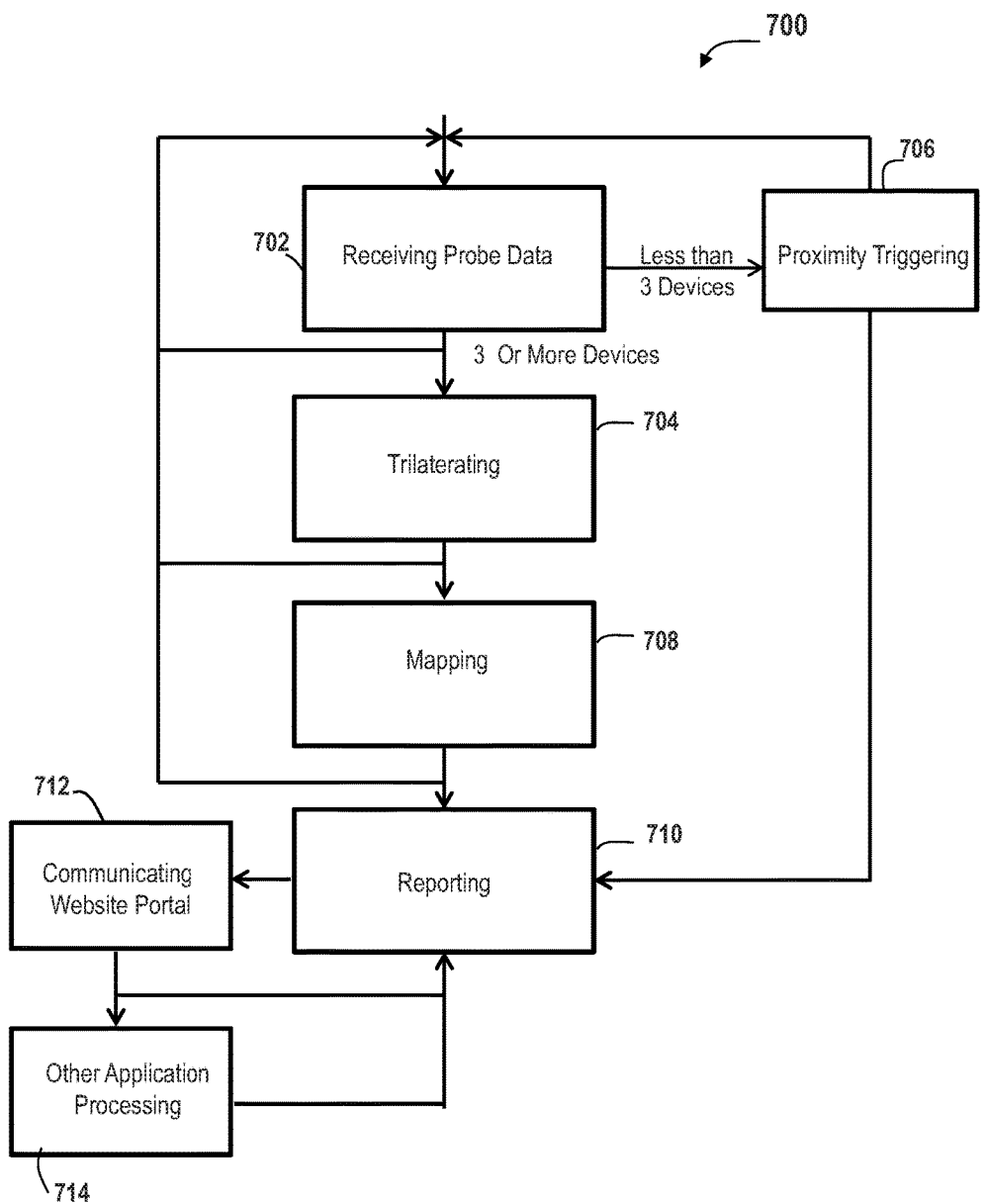
FIG. 7 illustrates a method of operation of an RMS, for example, a cloud server computer or other processing device, communicatively connected to a WAN by a wireless gateway for delivering vector data packets of respective mobile device(s), including, for example, by trilaterating to locate the respective mobile device(s), according to certain embodiments.

Referring to FIG. 7, in conjunction with FIGS. 1-6, a method 700 performed by the system 500, such as a server computer, cloud server computer, or other processing device, or combination, of the system 500, commences with a step of receiving 702 probe data, in collated and encrypted format, from the device 100, via the gateway device 302 over the network 304. The probe data includes, for example, vector data packet(s) corresponding to mobile device(s) 316, MAC address(es) of those device(s) 316, and time stamp for the packet(s), each respectively, located within threshold range of and detected the device 100.

If three or more of the devices 100 substantially concurrently (according to programmed parameters of the system 500 or otherwise) detect any of the mobile device(s) 316 within range, and the system 500 receives probe data therefor from the network 304, the method 700 continues to a step 704 of trilateration. In the step 704, the probe data is converted to x, y Cartesian coordinates in relation to given (or known or, in certain non-exclusive embodiments, derived or determined) similar coordinates of the three or more devices 100, respectively, of the detections.

If less than three of the devices 100 substantially concurrently (according to programmed parameters of the system 500 or otherwise) detect any of the mobile device(s) 316 within range, an event of proximity triggering is recorded by the system 500 in a step 706. Upon the step 702 or 706, the method 700 returns to the step 702, such that the step 702 of receiving is continuously, intermittently, or otherwise performed (as per the desired embodiment and application) to provide substantially or near real time location or proximity triggering, as applicable, with respect to each mobile device(s) 315 within range of the devices 100, respectively.

In a step of mapping 708, each detected mobile device(s) 316 corresponding to probe data detected by three or more devices 100 is mapped according to the converted x,y Cartesian coordinates, for example, each device 316 is plotted on a floorplan, chart, map, or other data format, with respect to mapped location(s) of the detecting devices 100. Upon the step of trilaterating 704 and/or mapping 708, the method 700 returns to the step 702 of receiving probe data.

The method 700 also may, but need not necessarily, include a step of reporting 710. In the reporting 710, probe data detected by devices 100 may be communicated, such as via the portal website 516 of the system 500 or otherwise, to or with a communications device (shown in example embodiment of FIG. 8, discussed below) allowed, permitted and/or capable of access, to the system 500, for example, over a wide area network 304 (and/or 812), such as the Internet or other network. The method 700 may, but need not necessarily, include other steps 714, for example, other application processing, reporting, and manipulating probe data received.

Example Embodiments

Figure 8:
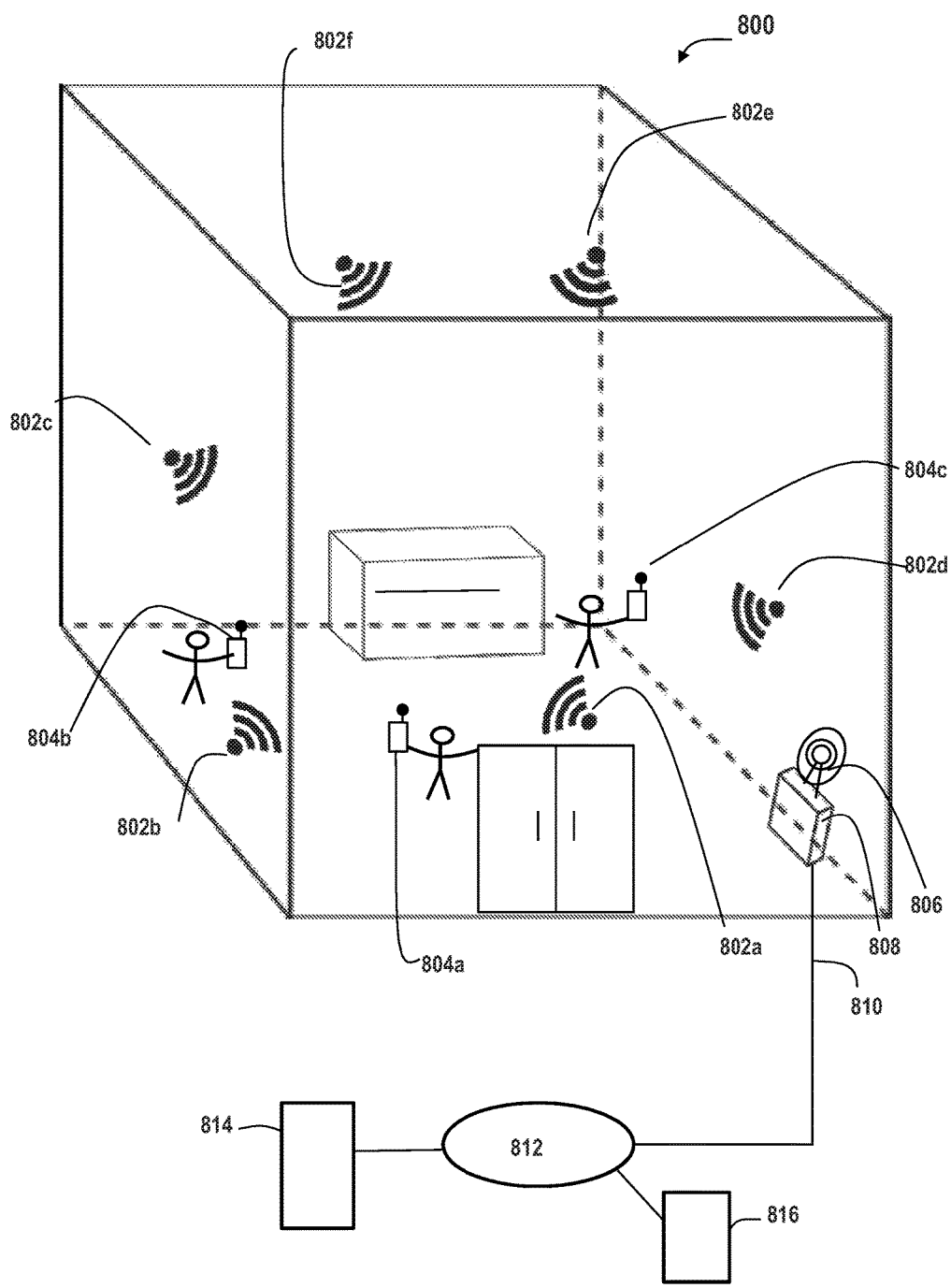
FIG. 8 illustrates a system of sensors, respectively, for detecting mobile devices within range of the sensors, respectively, for wirelessly communicatingly delivering vector data packets of the mobile devices over a LAN, to a gateway device, for communication over a WAN to a server computer, such as, for example, a cloud server or servers, according to certain embodiments.

Referring to FIG. 8, in a system 800 in accordance with certain non-exclusive embodiments, sensors 802*a-f*, respectively, such as those of the device 100, detect all mobile devices 804*a-c*, respectively, in-range, respectively, of the sensors 802*a-f*, respectively, to access probe data of the mobile devices 804*a-b*, respectively. For purposes of illustration and non-exclusive example with respect to the FIG. 8, sensors 802*a-c* and *f*, respectively, detect mobile device 804*a* in-range, respectively, of the sensors 802*a-c* and *f*, respectively; sensors 802*b-c* and *f*, respectively, detect mobile device 604*b* in-range, respectively, of the sensors 802*b-c* and *f*, respectively; and sensor 802*e* (and none of the other sensors) detects mobile device 804*c* in-range of the sensor 802*e* (and mobile device 804*c* is not in-range of any other sensors). In non-exclusive embodiments, as illustrated by the foregoing, each sensor has a respective select range for detection of any mobile device within the range of the sensor, which select range may be the same or different for the respective sensors, as desired in the implementation. At least three of the sensors are contemplated as detecting any particular mobile device in range for purposes of trilateration in the embodiments to locate the detected mobile device. Fewer than three sensors are contemplated as detecting any particular mobile device in range for purposes of proximity sensing (but not location by trilateration) in at least certain embodiments. Any number of the mobile devices may be within range of any one or more sensor in embodiments, and it is contemplated in the embodiments that no mobile device may be within range of any one or more sensor, at certain and/or various times.

In each instance in which a mobile device is within range of a sensor, the sensor accesses probe data of the mobile device. The probe data includes vector data packet(s) with associated MAC address and time stamp(s) of the packet(s) for the in range mobile device. If the mobile device is within respective range of at least three sensors, respectively, the probe data is converted by trilateration (or otherwise) to x, y (or other) Cartesian coordinates corresponding to location of the mobile device with respect to the at least three sensors. If the mobile device is within respective range of less than three sensors, respectively, the probe data measures proximity sensing (but not location by trilateration) for the mobile device.

In the system 800, each of the sensors 802*a-f*, respectively, is communicatively connected, e.g., wirelessly or otherwise, to an access point 806 of a local area network (LAN) 808, for example, a wireless LAN and wireless LAN controller of the network 808 or other communications network. The LAN 808 is communicatively connected to a gateway device 810, connecting the LAN 808 (and, thereby, the sensors 802*a-f* via the access point 806, the LAN 808 and the gateway device 810) to a remote communications network 812, such as a wide area network (WAN) that may, but need not necessarily, be the Internet.

A server computer 814, such as of or for a records management system 500 of the system 800, is communicatively connected to the communications network 812. Another processing device 816 may, but need not necessarily in the system 800, be communicatively connected to the network 812 for communicative access to a website portal or other component of the server computer 814. In certain embodiments, the server computer 814 is contemplated to be any one or more cloud server communicatively connected to the network 812. Although the network 812 is illustrated as unitary in the example, the network 812 may, in certain embodiments, be any one or more communications networks or combinations of such networks, including, but not limited to, any one or more wireless or wired data communications link or network, or combination of those links or networks, for example, cellular, Wifi, Internet, intranet, virtual private network (VPN), local area network (LAN), wide area network (WAN), optical network, and others.

In operation of the system 800, respective probe data detected of the mobile devices 804*a-c*, respectively, by the sensors 802*a-c* and *f*, respectively, the sensors 802*b-c* and *f*, respectively, and the sensor 802*e*, respectively, is collated and encrypted by the sensors 802*b-c*, *e* and *f*, respectively, for the mobile devices 804*a-c*, respectively, as applicable. In particular in the example, mobile device 804*a* is substantially concurrently detected by the sensors 802*a-c* and *f*, respectively, and the sensors 802*a-c* and *f*, respectively, each collate and encrypt probe data of vector data packets, associated MAC address, and time stamps of the packets of the mobile device 804*a*; mobile device 804*b* is substantially concurrently detected by the sensors 802*b-c* and *f*, respectively, and the sensors 802*b-c* and *f*, respectively, each collate and encrypt probe data of vector data packets, associated MAC address, and time stamps of the packets of the mobile device 804*b*; and the mobile device 804*c* is detected only by the sensor 802*e*, which sensor 802*e* collates and encrypts vector data packet, associated MAC address, and time stamp of the packet of the mobile device 604*c* for proximity sensing (but not trilateration, because only a single sensor then detects the mobile device). In the example, there are not any mobile devices within range of the sensor 802*d*, therefore, the sensor 802*d* is not at the time or instance of the example detecting any probe data of any mobile device.

The respective collated and encrypted probe data of the mobile devices 804*a-c*, respectively, is communicated (e.g., wirelessly or otherwise, as applicable in the implementation) by the sensors 802*a-c* and *f*, respectively, the sensors 802*b-c* and *f*, respectively, and the sensor 802*e*, respectively, to the access point 806. The access point 806 receives the collated and encrypted probe data, respectively, and communicates the probe data over the LAN 808, for example, over a guest access SSID of a wireless LAN controller of the LAN 808, without impacting a core corporate or other network, to the gateway device 810 for communication over the network 812 to the server computer 814. The gateway device 810 communicates the probe data over the network 812 to the server computer 814, and the server computer 814 receives the probe data from the network 812.

The server computer 814, receiving the probe data from the network 812, records the probe data, respectively, for example, in storage with associated MAC address, respectively, and time stamp, respectively, for the mobile devices 804*a-c*, respectively. For the mobile device 804*a*, the server computer 814 converts, by trilateration (or otherwise), the respective probe data of the sensors 802*a-c* and *f*, respectively, to x, y Cartesian coordinates. For the mobile device 804*b*, the server computer 814 converts, by trilateration (or otherwise), the respective probe data of the sensors 802*b-c* and *f*, respectively, to x, y Cartesian coordinates. For the mobile device 804*c*, the server computer 814 records the respective probe data of the sensor 804*e* for corresponding proximity purposes.

On conversion, by trilateration (or otherwise), by the server computer 814, the server computer 814 maps the mobile devices 804*a, b*, respectively, based on the respective x, y Cartesian coordinates (or as otherwise implemented). The mapping may include plot of location of the mobile devices 804*a, b* with respect to the detecting sensors 802*a-c, f*, respectively, and 802*b-c, f*, respectively, in a floorplan of an area or other format (e.g., measurement, direction, and other information of the mobile devices 804*a, b*, respectively). The mapping may also, but need not necessarily, include proximity indicator of location of the mobile device 804*c* with respect to the detecting sensor 802*e*, or other information of the mobile device 804*c*. For non-exclusive example, the proximity indicator may be a report of a trigger event when the mobile device 804*c* is within a predefined range/radius of the sensor 802*e* (or other sensor, as applicable). The proximity range/radius of the sensors may respectively be set to allow different detection levels depending upon application requirements.

At least certain embodiments contemplate that mobile device vector data of the sensors, as applicable, may be substantially constantly passed to the server computer and, as applicable in the case of detection by three of more sensors, mapping and reporting by the server computer may be substantially in real time. For example, the server computer may record and convert vector data packets to create real time positional and proximity data points that may be plotted onto a geo located mapping system. The server computer incorporates a trilateration engine or other vehicle that computes Cartesian x,y coordinates (or other positional relationship) from the mobile device vector data, and dynamically in real time, via a mapping module or other vehicle, maps graphically presentation of the positional data for mobile devices.

According to certain non-exclusive embodiments, the server computer may include a website or other components providing a dashboard, spreadsheet, or other format, for example, a software as a service (SaaS) report, accessible over the network 812 by one or more devices 816. Features of the website or other components may provide, in non-exclusive examples, departmental zoom, data segregation tools, and other elements, such as to provide ease of reporting via the devices 816 (e.g., any web connected user device, etc.).

In certain non-exclusive embodiments, the trilateration by the server computer may include additional location logic to allow packet timing inputs measuring the Time of Arrival (ToA) of vector data packets and the Signal to Noise Ratio (SNR) of the probe output. These measures improve vector precision and overcome external Radio Frequency Interference (RFI) caused by environmental factors that can impact signal stability. Also the server computer may establish links to mobile application programming interfaces (APIs) of mobile devices, such as, for example, to access accelerometer and internal positioning registers (in Android or other devices). Mapping and reporting by the server computer are enhanced by such data precision measures, such as by determining if the applicable mobile device is actually moving and, if so, in what direction and at what rate.

In certain non-exclusive embodiments, the server computer, via trilateration and mapping, provides (or in combination with other elements permits) extraction of data analytics, both visually and in file format using an HTML 5 and XML API interface or otherwise. Filters and dashboard metrics may provide a visual map data and enable analyses to give data cuts measured over by time, by user, and by departmental location, or otherwise. A zoom component of the server computer, accessible by devices 816 over the network 812, together with other elements, may permit focus on particular activity in a particular area of the store, for particular mobile device, and allow drill down on a larger scale heatmap, or otherwise, such as to determine the numbers and type of user mobile device(s) in that location and to determine dwell time.

In non-exclusive embodiments in which the server computer has a cloud server based architecture, for example, of the mapping elements, a website of the server computer may link to an in-store (or other area or facility) mobile app of the mobile device. Such link to the mobile app of the mobile device may, for example, support predefined views or filters to be enabled and visual map output presentation to the mobile device via the mobile app interface. Similarly, a hierarchy of system user mobile devices may be permitted access to review map plots at different levels of granularity. Accordingly, the server computer may provide highly scalable portal access, to allow remote users mobile devices to compare and contrast mapping results across countries, regions, stores, departments, and other categories or aspects, such as depending upon user mobile device preference and access settings.

In certain non-exclusive embodiments, reporting accessible via the server computer can be configurable, such as, for example, for delivery (e.g., push or otherwise) of basic visual analytic data regarding detected mobile devices, such as to specific manager email address or to a secondary data repository to allow history files to be created and archive data map to be stored or otherwise employed or manipulated. Such history files and archive data map, for example, may be compared to before and after store (or other facility or area) activity following specific marketing campaigns (or other directives).

Figure 9:
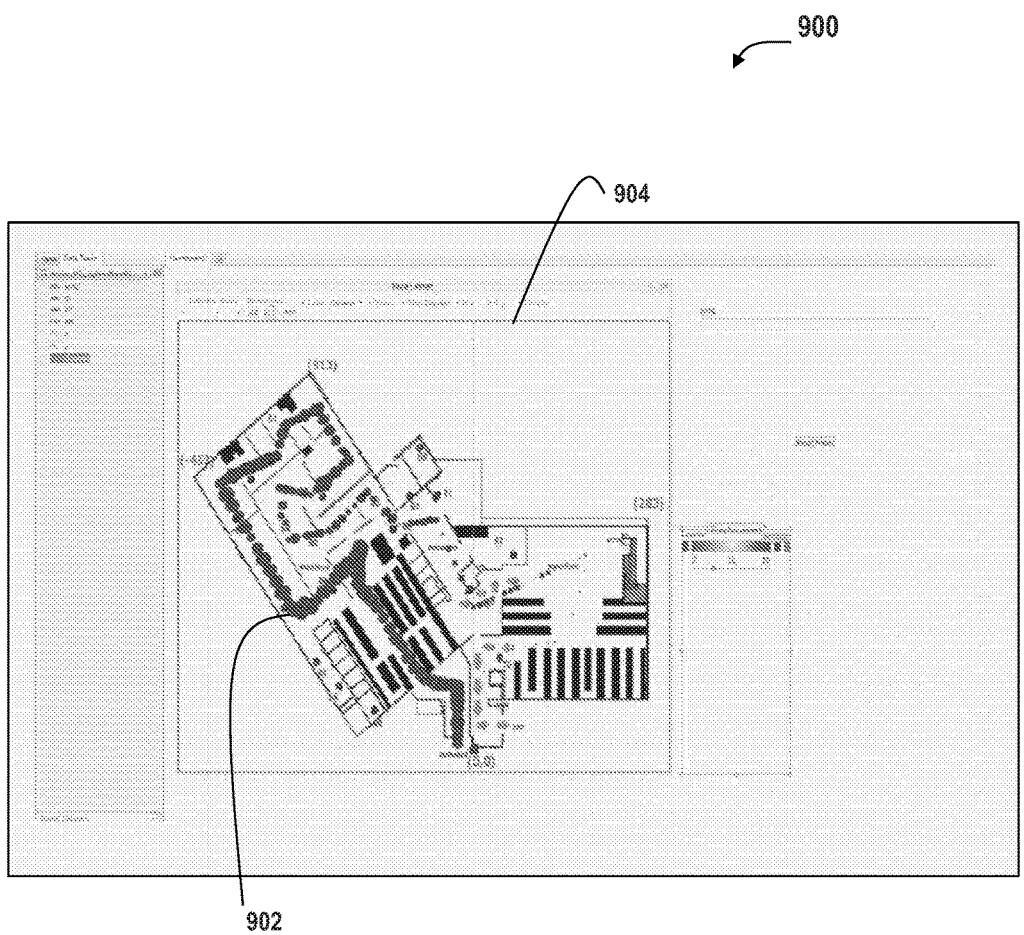
FIG. 9 illustrates an example portal communicatively accessible by a communications device over a WAN, to map and/or otherwise report regarding one or more mobile devices detected by one or more access device communicatively connected to a LAN and gateway, according to certain embodiments.

Referring to FIG. 9, in conjunction with FIG. 8, an exemplary portal 900 of a map or other report accessible by a device, such as the device(s) 816, from the server computer 814, or otherwise of the system 800, includes a sample store map 904. A trace 902, for example, identifies the route taken and dwell time (e.g., illustrated by bigger points) of a known user device, such as any of the mobile device 802*a-c*. The track and trace information can be examined in a particular department and using a zoom tool, and a data map snapshot can be exported for closer examination of the user device (e.g., a store or other guest activity) in that particular part of the store or other location.

Figure 10:
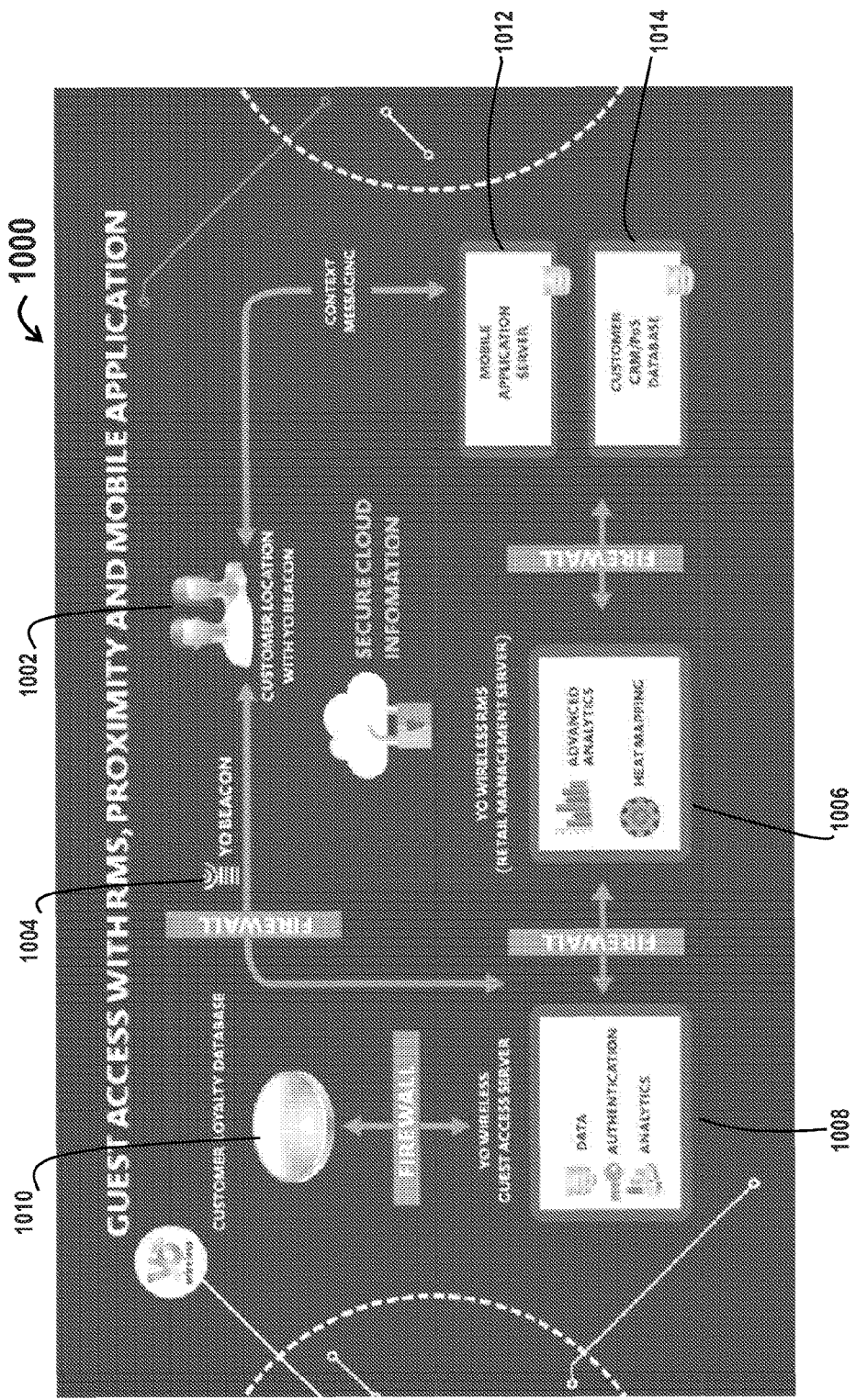
FIG. 10 illustrates an example service application for digital marketing and loyalty programming, according to certain embodiments.

Referring to FIG. 10, an exemplary service application 1000, in accordance with certain embodiments, allows a retail or other store or environment to individually interface with known brand loyal customers via digital marketing to customer devices 1002, for example, the devices 316, 804*a-c*, in range of any access device(s) 1004, for example, the device(s) 100, 200, 802*a-f*. As a non-exclusive example, the customer device 1002 within range of three or more access devices 1004 may be located, such as on a map or floorplan, relative to the devices 1004. Location of the customer device 1002, such as by trilateration of probe data, is performed by a server or processing device 1006, which may be remote and communicatively connected to a host wireless or other network of the store or other environment, for example, a cloud server computer. The device 1006 may generate location data, such as plotting, heat mapping, and other services, as well as data analytics relevant to the location data, via the device 1006 itself or in conjunction with other services.

The access device(s) 1004, upon detecting any customer device 1002, communicates via the host network and through a guest gateway 1008, with the device 1006. The device 1006, in response to locating the customer device 1002, may communicatively connect, for example, via a portal website or other device, to a managerial or other device, which may, but need not necessarily, be remote from the device 1006. The managerial or other device may be a store- or location-specific device, such as a manager's phone, tablet or desktop computer, or another device.

Additionally, the device 1006 may be communicatively connected, either local, remote or otherwise, with any of a customer loyalty database 1010, a mobile application server 1012, and customer relationship manager or point of sale device 1014, such as a database, or other. In such arrangement, the access device(s) 1004 communicate, over a secure WiFi link, with a host network and the gateway 1008, and on to the device 1006. An opt-in sign, for example, by email, Facebook™' Twitter™, or other device or network, including an electronic social network, to initially connect the customer device 1002 to the one or more devices 1004. Once so connected, the customer device 1002 has created, within the application 1000, a respective digital signature that may be employed as a messaging location when the customer enters the location or store of the access devices 1004. The messaging location may be employed, for example, via the customer loyalty database 1010, the mobile application server, the CRM/PoS device 1014, and other devices and elements, for personal welcome, predictive activity message, marketing, other messaging, loyalty servicing, loyalty programs, and many other and different services and solutions.

The customer need not download any app or create a direct loyalty profile of the customer device 1002, which have in other arrangements presented barriers to effectiveness and participation with customers, as example. Moreover, the customer need not set up any particular connection (e.g., such as Bluetooth™) other than normal WiFi (e.g., 802.11 or other) operation of the customer device 1002. The result is non-invasive to the customer device 1002 of the customer, and occurs seamlessly.

Referring to FIG. 11, an exemplary system 1100, in accordance with certain embodiments, is employed in a store or other area or facility 1102. As respective mobile devices 1104*a-c* of store guests, or others, traverse the store 1002, locations of the mobile devices 1104*a-c* are determined and particular distinct or similar messaging, marketing, loyalty and other services may be directed for receipt by the mobile devices 1104*a-c*, respectively. Even more, heat mapping or other mapping and/or locating, analytics, and other applications are possible, for example, point of sale devices may support these for management and customers, and/or others.

Numerous variations in the foregoing are possible. In certain alternatives, the embodiments couple beacons with cloud-based trilateration and scalable mapping, and provide a powerful visual analytics platform through website portal or other accessible elements. The embodiments, in certain alternatives, may be integrated, incorporated with, or communicatively connected to other and further reporting tools of any LBS and/or RTLS initiative, and are more easily executed using an existing local area network, such as WLAN infrastructure, saving on project delivery time and cost. Also, in certain alternatives, download and processing of any specified app or software by customer or other devices, and/or operations according to specified communications technology, such as Bluetooth™ enabled or the like, is not required. Further, in certain alternatives, a wide variety of any or all WiFi connected devices may be detected and captured for analyses, providing, for example, improved data sample ratios compared to all guests entering a store or other location.

Further in alternatives, network implementation and integration of the embodiments may be non-invasive to any existing network, and the result may be low unit production cost for implementation and integration to provide as a software as a service (SaaS)-based delivery model. Consequently, low cost of ownership and significant return on investment may be possible. In other alternatives, highly configurable dashboard filters and XML/HTML5 reporting provides flexibility and ease of integration into existing reporting platforms and emerging mobile user applications. The embodiments can lower barriers to entry for adopting mobile channel marketing and the like. In other alternatives, the embodiments may be linked to extend visual and other data and information to show select or other groups or demographics, including, as non-exclusive example, tracking of individual, group, or other category of device position and location in near real time. Such alternatives may provide greater opportunity to influence customer and individual shopping habits and present relevant timely offers, or other programs or effects.

In various alternatives, the embodiments seamlessly interconnect to a host exit point of sale (PoS) system and relevant data, creating, for example, a joined up multichannel gateway. This may extend a customer's or individual's mobile experience and enhance customer relationship management (CRM) opt in data harvesting. Data aggregation and context messaging capabilities address increasing demands for retailers to engage and serve mobile users in the store and extend the brand association and loyalty into the increasingly crucial mobile channel. The embodiments, and alternatives thereof, can allowing on-line and in-store based marketing initiatives to reach mobile devices of customer and other users.

In other alternatives, the embodiments provide an LBS, proximity and context messaging solution, in applications which complement and support existing WLAN installations and the like. The alternatives and embodiments are capable of rapid deployment and integration, with limited or minimal network disruption. Moreover, the near real time results are capable of providing a hybrid topography that can dovetail into any long term RTLS/LBS initiative. The hybrid topography also allows, for example, the further integration of app-based beacons and other beacons, as acceptance and improvement of those other technologies develops. The embodiments and alternatives further can deliver first adopter competitive advantage to retailers and others, such as, for example, by generating rapid tangible results, alongside all current omnichannel integrated marketing projects that call for indoor, outdoor or other location of mobile devices.

In the foregoing, the invention has been described with reference to specific embodiments. One of ordinary skill in the art will appreciate, however, that various modifications, substitutions, deletions, and additions can be made without departing from the scope of the invention. Accordingly, the specification and figures are to be regarded in an illustrative rather than a restrictive sense, and all such modifications substitutions, deletions, and additions are intended to be included within the scope of the invention. Any benefits, advantages, or solutions to problems that may have been described above with regard to specific embodiments, as well as device(s), connection(s), step(s) and element(s) that may cause any benefit, advantage, or solution to occur or become more pronounced, are not to be construed as a critical, required, or essential feature or element.

What is claimed is:

1. A system for locating a mobile device emitting a radio frequency signal, a wireless access point device of a wireless local area network is configured to communicatively connect to a wide area network, comprising:
    a first access device for wirelessly communicatively detecting a first signal strength of the radio frequency signal in relation to the first access device, a media access control (MAC) address, and a first timestamp of the first signal strength, of the mobile device;
    a second access device for wirelessly communicatively detecting a second signal strength of the radio frequency signal in relation to the second access device, the MAC address, and a second timestamp of the second signal strength, of the mobile device;
    a third access device for wirelessly communicatively detecting a third signal strength of the radio frequency signal in relation to the third access device, the MAC address, and a third timestamp of the third signal strength, of the mobile device;
    a trilateration processor; and
    a gateway device communicatively connected to the wireless local area network and the trilateration module, for communicative delivery of the first signal strength, the MAC address, and the first timestamp, the second signal strength, the MAC address, and the second timestamp, and the third signal strength, the MAC address, and the third timestamp, to the trilateration module;
    wherein the first timestamp, the second timestamp and the third timestamp are substantially concurrent, and the first access device, the second access device and the third access device, wirelessly communicatively connect to the wireless access point device for delivery, respectively, of the first signal strength, the MAC address, and the first timestamp, the second signal strength, the MAC address, and the second timestamp, and the third signal strength, the MAC address, and the third timestamp.

2. The system of claim 1, wherein the gateway and the trilateration engine are each respectively communicatively connected to a wide area network.

3. The system of claim 2, wherein the wide area network is the Internet.

4. The system of claim 1, wherein:
    the first access device includes a first modular architecture of a first wireless sensing layer module for reading the first signal strength and the MAC address, and deriving the first timestamp, a first collation and encryption module for collating and encrypting the first signal strength, the first timestamp and the MAC address, and a first wireless transmission module for communicatively connecting to the wireless access point device.

5. The system of claim 4, wherein:
    the second access device includes a modular architecture of a second wireless sensing layer module for reading the second signal strength and the MAC address, and deriving the second timestamp, a second collation and encryption module for collating and encrypting the second signal strength, the second timestamp and the MAC address, and a second wireless transmission module for communicatively connecting to the wireless access point device; and
    the third access device includes a modular architecture of a third wireless sensing layer module for reading the third signal strength and the MAC address, and deriving the third timestamp, a third collation and encryption module for collating and encrypting the third signal strength, the third timestamp and the MAC address, and a third wireless transmission module for communicatively connecting to the wireless access point device.

* * * * *